United States Patent [19]

Saeki et al.

[11] 4,419,477
[45] Dec. 6, 1983

[54] POWDER PHENOLIC RESIN COMPOSITION FOR DRY PROCESS RESIN-BONDED FELT

[75] Inventors: Yukio Saeki; Naomitsu Inoue, both of Fujieda, Japan

[73] Assignee: Sumitomo Durez Company, Ltd., Tokyo, Japan

[21] Appl. No.: 430,199

[22] Filed: Sep. 30, 1982

[30] Foreign Application Priority Data

Oct. 5, 1981 [JP] Japan ................................ 56-157464

[51] Int. Cl.³ .............................................. C08L 61/10
[52] U.S. Cl. .................................... 524/290; 524/287; 524/291; 524/541; 524/594; 524/904; 525/501; 525/934
[58] Field of Search ................ 525/501, 934; 524/287, 524/290, 291, 541, 594, 904

[56] References Cited

U.S. PATENT DOCUMENTS 4,073,775  2/1978  Matsuo et al. ...................... 528/112

FOREIGN PATENT DOCUMENTS 1900063  8/1970  Fed. Rep. of Germany .
153858   4/1979  Japan .

OTHER PUBLICATIONS

Zafar et al., Chemical Abstracts, vol. 82, p. 8, 17223r (1975).
Hiroshima et al., 36-Plastics Manuf., vol. 91, 21849c (1979).

*Primary Examiner*—Theodore E. Pertilla
*Attorney, Agent, or Firm*—James F. Tao; James F. Mudd

[57]  ABSTRACT

This invention relates to a powdered phenolic resin composition suitable for the production of dry processed resinbonded felt. The phenolic resin composition imparts a good release of the felt from the heated platen or belt and has a rapid cure rate. The powdered phenolic composition is composed of a novolac type phenolic resin, or a mixture of novolac and resole type with an aromatic carboxylic acid as an additive. The resin mixture has a bulk density of 0.29–0.36 gm/cm³, and contains 0.3–5 parts by weight of the aromatic carboxylic acid to 100 parts by weight of phenolic resin. Said aromatic carboxylic acid has the formula

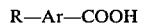

R—Ar—COOH wherein
R is selected from hydrogen, hydroxy or alkoxy groups, and
Ar is selected from phenyl, phenylalkenyl or phenylalkyl groups.

7 Claims, No Drawings

POWDER PHENOLIC RESIN COMPOSITION FOR DRY PROCESS RESIN-BONDED FELT

BACKGROUND OF THE INVENTION

This invention relates to a powdered phenolic resin composition suitable for use in the dry process for the preparation of resin-bonded felt.

Resin-bonded felt is made by incorporating a thermosetting or thermoplastic resin into a fibrous bed followed by heating and/or curing the resin to hold the fibers in a compressed state to form a felt or felted material. The resin may be cured or semi-cured to form an intermediate or final product.

Felt, made by incorporating a thermosetting or a thermoplastic resin into a pad of carded fiber, is generally called resin-bonded felt. Resin-bonded felt relating to the present invention is ordinarily obtained either by curing or semi-curing a powder phenolic resin at a temperature range of 130°–220° C. subject to hot blowing air, after incorporating 10–30 parts by weight of said powder phenolic resin into 100 parts by weight of loose fiber with successive carding. The resin-bonded felt thus obtained is classified as cured felt and semi-cured felt. Cured felt is generally used as it is for cushioning, sound absorption or thermal insulation materials. As for semi-cured felt, the phenolic resin binder thereof remains still in an incomplete stage of curing, so it is further pressed under heat and formed to rigid articles used for structural parts of automobiles, such as ceiling cores or dashboard components.

A well-known exemplary manufacturing system of resin-bonded felt by incorporating a powder phenolic resin into fiber is disclosed in the Japanese Patent Publication No. Sho 44-4876. Generally, when phenolic resin is used as a binder of felt, owing to the comparatively weak cohesive strength of fiber, even a slight adhesion of the felt to the forming surfaces by said phenolic resin causes poor release of the felt after the heating step of manufacture.

Poor release results in a disfigured torn surface felt, which is unacceptable in market, being inferior in appearance, density and strength. On the other hand, due to energy-saving reasons, a phenolic resin having a rapid rate of cure is required for shortening the heating time during felt manufacture. Several methods are known for improving the rate of cure of novolac type phenolic resins: use of ortho-novolac type, incorporating an aromatic monocarboxylic acid such as salicyclic acid thereinto (Japanese Patent Application No. Sho 36-20589), incorporating a bivalent metal salt thereinto (Japanese Patent Application No. Sho 40-26719), etc.

After much investigation to improve the rate of cure of phenolic resins as well as to improve the release of the felt obtained from the conveyor-belt during the manufacture thereof, the inventors have found that a powder phenolic resin composition, comprising 0.3–5 parts by weight of an aromatic carboxylic acid to 100 parts by weight of the resin and the composition having a bulk density of 0.29–0.36 g/cm$^3$, improves the rate of cure of the phenolic resin as well as release of the felt from the conveyor-belt.

Aromatic carboxylic acids according to the present invention have a formula of R—Ar—COOH, wherein;
R is selected from hydrogen, hydroxy group or alkoxy group, and
Ar is selected from phenyl group, phenylalkenyl group or phenylalkyl group.

It is an object of this invention to provide a phenolic resin composition for dry process felt production that will allow the release of the felt from the fiber retaining surfaces in a clean manner.

It is an additional object of this invention to provide a phenolic resin composition that will cure rapidly to allow greater speed of production.

SUMMARY OF THE INVENTION

This invention relates to a powdered phenolic resin composition suitable for the production of dry processed resin-bonded felt, which has a rapid cure cycle and allows for clean rapid release from the heated platens or belts.

The phenolic composition is composed of a novolac type phenolic resin, or a mixture of novolac and resole types with an aromatic carboxylic acid as an additive. The resin composition has a bulk density of 0.29–0.36 gms/cm$^3$, and contains 0.3–5 parts by weight of acid to 100 parts resin. Said aromatic carboxylic acid has the formula R—Ar—COOH wherein R is selected from hydrogen, hydroxy or alkoxy groups, and Ar is selected from phenyl, phenylalkenyl or phenylalkyl groups.

Incorporation of a lubricant into the resin composition at the level of 0.5–3 parts by weight per 100 parts of phenolic resin may also improve the release properties.

DETAILED DESCRIPTION OF THE INVENTION

Dry processed resin-bonded felt is prepared by the addition of a dry resin composition to fibrous material followed generally by the application of pressure and heat to produce a felt of the desired thickness and stability. This invention discloses a phenolic composition that provides improved cure cycles and improved release.

The novolac type phenolic resin composition according to the present invention is a thermoplastic product prepared by reacting one or more phenols with one or more aldehydes with an acid catalyst, to which are incorporated hexamethylenetetramine (hereinafter called "hexamine"), and optionally lubricants or fillers thereinto with successive mix-grinding in a mill. The resole type phenolic resin composition according to the present invention is a thermosetting product prepared by reacting one or more phenols with one or more aldehydes with a basic catalyst, and optionally incorporating lubricants or fillers thereinto, with successive mix-grinding in a mill.

Phenols hereof used as raw material for said phenolic resin are phenol, cresol, xylenol, resorcin, hydroquinone, para-t-butylphenol, etc., and those modified in the presence of aniline, urea, melamine, cashew nut shell oil, etc., are also usable. Aldehydes hereof are formalin, paraformalde, acetaldehyde, furfural, etc. Acid catalysts hereof are inorganic acids such as sulfuric, hydrochloric and phosphoric acid, or organic acids such as formic, acetic, oxalic and paratoluene sulfonic acid. These are individually or jointly used. Basic catalysts hereof are oxides, hydroxides or carbonates of alkali metals such as calcium and magnesium, and nitrogen-containing substances such as ammonia, triethyl amine and triethanol amine. They are used either individually or jointly.

Aromatic carboxylic acids according to the present invention have a formula of R—Ar—COOH, wherein;

R is selected from hydrogen, hydroxy or alkoxy groups, and

Ar is selected from phenyl, phenylalkenyl or phenylalkyl groups.

Typical examples are salicyclic acid, meta-hydroxy benzoic acid, para-hydroxy benzoic acid, phenyl propionic acid, cinnamic acid, ortho-methylphenyl acetic acid, meta-methylphenyl acetic acid, and para-methylphenyl acetic acid. Para-hydroxy benzoic acid is the preferred acid.

Bulk density represents the physical property relating to the intrinsic specific gravity of a substance, shape of particles, particle distribution therewith, etc. The method for determining bulk density is based upon that represented in our previous Japanese Patent Application No. Sho 55-170280. Generally speaking, bulk density of commercially available powder phenolic resins is in the range of 0.1-0.6 g/cm$^3$. The incorporating ratio of 0.3-5 parts by weight of said aromatic carboxylic acids into 100 parts by weight of selected phenolic resins with mixing produces a resin-acid combination with a bulk density of 0.29-0.36 g/cm$^3$. The mixture accelerates the cure and particularly causes improved release of felt from the conveyor-belt. Lubricants usable in the present invention are ordinary ones, preferably stearic acid, stearic acid salts, stearic esters, paraffins, polyethylene wax and ethylene bis-stearic amide. Inorganic as well as organic fillers are also usable in the present invention. The incorporating ratio of said lubricants hereof is 0.5-3 parts by weight of said phenolic resin. When the ratio is less than 0.5 parts by weight, the release of felt becomes poor, and when it is more than 3 parts by weight, strength of the felt obtained deteriorates.

The inventors hereof will explain the present invention with nonlimitative Examples and comparative examples, wherein both "parts" and "percent" represent "parts by weight" and "percent by weight", respectively.

PREPARATION EXAMPLE 1

To a reaction kettle with a reflux cooler and a stirrer, 1000 parts of phenol, 690 parts of 37% formalin and 2 parts of 35% hydrochloric acid were charged. After reacting the mixture for 4 hours at 95°-100° C. under reflux, followed by approximately 5 hours dehydration under vacuum, it was dumped from the kettle. After cooling, a white solid novolac type phenolic resin with a melting point of 85° C. and a moisture content of 0.3% was obtained.

PREPARATION EXAMPLE 2

To a reaction kettle with a reflux cooler and a stirrer, 1000 parts of phenol, 1380 parts of 37% formalin, 50 parts of 25% sodium hydroxide solution and 150 parts of 28% aqueous ammonia were charged. After reacting the mixture for 30 minutes at 95°-100° C., followed by approximately 3 hours' dehydration under vacuum, it was dumped from the kettle for a rapid cooling. A yellow solid resole type phenolic resin having a melting point of 78° C. and a moisture content of 0.8% was obtained.

EXAMPLE 1

In a mill 100 parts of novolac type phenolic resin according to Preparation Example 1, 10 parts of hexamine, 2 parts of para-hydroxy benzoic acid and 1 part of calcium stearate were incorporated, and a powder novolac type phenolic resin composition having a bulk density of 0.30 g/cm$^3$ was obtained by mix-grinding.

20 Parts of the powder phenolic resin composition was spread onto 100 parts of loose fiber. A 10 cm thick pad of carded fiber was formed from this resin-treated fiber through a carding machine. It was transferred by a conveyor-belt to a heating oven and subjected to heat for 90 seconds at 150° C. to obtain a 3 cm thick semi-cured felt. This was charged into a press, and cured under the following conditions, a heated platen of 200° C., a pressure of 10K g/cm$^2$, and 30 to 60 seconds in pressing time to obtain formed felts having a specific gravity of 0.79-0.81 and thickness of 3.0-3.2 mm. Test specimens (20 cm×5 cm) were prepared from this formed felt. Bending test was run on a universal testing machine, in which said specimens were respectively supported on a 15 cm span and a load rate of 50 mm/min. The average bending strength at break under load was obtained by testing 10 specimens from each formed felt. Table 1 indicates the weight of felt adhering to the steel plate and the average bending strength of formed felt.

EXAMPLES 2 and 3

The process outlined in Example 1 was followed, using the proportions and ingredients indicated in Table I. The results of the weight of felt adhering to the steel plates and average bending strength obtained from each of the examples is shown in Table I.

COMPARATIVE EXAMPLES 1-6

The process outlined in Example 1 was followed using the ingredients and proportions as indicated in Table I. The results of each formulation, e.g., weight of felt adhering to the steel plates, average bending strength, etc., are shown in Table I.

As clarified in the results according to Examples 1, 2 and 3 of Table 1, only these Examples where phenolic resins having a bulk density of 0.29-0.36 g/cm$^3$, and containing aromatic carboxylic acid in a proportion of 0.3-5 parts against 100 parts of the resin were used, showed improvement in release of felt from the plate and acceleration in rate of cure.

TABLE I

|  |  | Examples | | | Comparative Examples | | |
|---|---|---|---|---|---|---|---|
|  |  | 1 | 2 | 3 | 1 | 2 | 3 |
| Formulation (parts) | Resin (Preparation Example 1) | 100 | 100 | 40 | 100 | 100 | 100 |
|  | Resin (Preparation Example 2) | — | — | 60 | — | — | — |
|  | Hexamine | 10 | 10 | — | 10 | 10 | 10 |
|  | para-hydroxy benzoic acid | 2 | — | 2 | 2 | 2 | 0.2 |
|  | Salicyclic acid | — | 1.5 | — | — | — | — |
|  | Calcium stearate | 1 | 1 | 1 | 1 | 1 | 1 |
|  | Ratio of aromatic carboxylic acid to 100 parts of phenolic resin | 2 | 1.5 | 2 | 2 | 2 | 0.2 |
| Powder property | Bulk density (g/cm$^3$) | 0.30 | 0.36 | 0.32 | 0.26 | 0.39 | 0.29 |

TABLE I-continued

| | | | | | | | | | | | | | |
|---|---|---|---|---|---|---|---|---|---|---|---|---|---|
| Release of felt | Weight of fiber adhering to 1000 cm² of steel plate (g) | upper plate | 1.0 | | 0.8 | | 1.2 | | 14 | | 1.0 | | 3.5 |
| | | lower plate | 1.1 | | 1.2 | | 1.7 | | 0.5 | | 15 | | 3.7 |
| Curing of resin in felt | Press time at 200° C. | | 30 | 60 | 30 | 60 | 30 | 60 | 30 | 60 | 30 | 60 | 30 | 60 |
| | Average bending strength of 10 specimens (Kg/cm²) | | 353 | 415 | 337 | 412 | 311 | 370 | 285 | 342 | 253 | 315 | 29 | 146 |

| | | | Comparative Examples | | |
|---|---|---|---|---|---|
| | | | 4 | 5 | 6 |
| Formulation (parts) | Resin (Preparation Example 1) | | 100 | 100 | 40 |
| | Resin (Preparation Example 2) | | — | — | 60 |
| | Hexamine | | 10 | 10 | — |
| | para-hydroxy benzoic acid | | 7 | — | 2 |
| | Salicyclic acid | | — | — | — |
| | Calcium stearate | | 1 | 1 | 1 |
| | Ratio of aromatic carboxylic acid to 100 parts of phenolic resin | | 7 | 0 | 2 |
| Powder property | Bulk density (g/cm³) | | 0.33 | 0.31 | 0.26 |
| Release of felt | Weight of fiber adhering to 1000 cm² of steel plate (g) | upper plate | 2.4 | 1.4 | 10 |
| | | lower plate | 5.3 | 1.6 | 2.4 |
| Curing of resin in felt | Press time at 200° C. | | 30  60 | 30  60 | 30  60 |
| | Average bending strength of 10 specimens (Kg/cm²) | | 143  160 | 15  108 | 7  68 |

What we claim:

1. A powdered phenolic resin composition for resin-bonded felt produced by the dry process comprising a phenol-aldehyde resin, an aromatic carboxylic acid having a formula R—Ar—COOH present in the range of about 0.3 to 5% of the phenol-aldehyde resin and the composition having a bulk density of about 0.29–0.36 g/cm³, wherein R is selected from hydrogen, hydroxy or alkoxy groups, Ar is selected from phenyl, phenylalkenyl or phenylalkyl groups.

2. A powdered phenolic resin composition according to claim 1 wherein a lubricant in the range of about 0.5–3% of the phenol-aldehyde resin is added.

3. A powdered phenolic resin composition according to claim 1 or 2 wherein the aromatic carboxylic acid is para-hydroxy benzoic acid.

4. A powdered phenolic resin composition according to claim 1 or 2 wherein the phenol-aldehyde resin is a phenol-aldehyde novolac resin.

5. A powdered phenolic resin composition according to claim 1 or 2 wherein the phenol-aldehyde resin is a mixture of a phenol-aldehyde novolac resin and a phenol-aldehyde resole resin.

6. A powdered phenolic resin composition of claim 4 wherein the aromatic carboxylic acid is para-hydroxy benzoic acid.

7. A powdered phenolic resin composition of claim 5 wherein the aromatic carboxylic acid is para-hydroxy benzoic acid.

* * * * *